(12) United States Patent
Segal (10) Patent No.: US 10,606,354 B2
(45) Date of Patent: *Mar. 31, 2020

(54) APPARATUS, METHODS, AND SYSTEMS FOR USING IMAGINED DIRECTION TO DEFINE ACTIONS, FUNCTIONS, OR EXECUTION

(71) Applicant: NAQI LOGICS, LLC, York, PA (US)

(72) Inventor: David Lee Segal, York, PA (US)

(73) Assignee: NAQI LOGICS, LLC, York, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/356,701

(22) Filed: Mar. 18, 2019

(65) Prior Publication Data

US 2019/0212818 A1 Jul. 11, 2019

Related U.S. Application Data

(63) Continuation of application No. 15/877,206, filed on Jan. 22, 2018, now Pat. No. 10,275,027.

(60) Provisional application No. 62/449,158, filed on Jan. 23, 2017.

(51) Int. Cl.
  *G06F 3/01* (2006.01)
  *G01C 19/58* (2006.01)
  *G06F 3/0346* (2013.01)

(52) U.S. Cl.
  CPC ............ *G06F 3/015* (2013.01); *G01C 19/58* (2013.01); *G06F 3/012* (2013.01); *G06F 3/017* (2013.01); *G06F 3/0346* (2013.01)

(58) Field of Classification Search
  CPC combination set(s) only.
  See application file for complete search history.

(56) References Cited

U.S. PATENT DOCUMENTS

| | | | |
|---|---|---|---|
| 5,470,081 | A | 11/1995 | Sato et al. |
| 5,474,082 | A | 12/1995 | Junker |
| 5,638,826 | A | 6/1997 | Wolpaw et al. |
| 5,724,987 | A | 3/1998 | Gevins et al. |
| 5,840,040 | A | 11/1998 | Altschuler et al. |

(Continued)

FOREIGN PATENT DOCUMENTS

WO 2011/140303 11/2011

OTHER PUBLICATIONS

PCT International Application No. PCT/US2018/014736, The International Search Report and the Written Opinion of the International Searching Authority, dated Apr. 3, 2018, 11 pages.

(Continued)

*Primary Examiner* — Travis R Hunnings
(74) *Attorney, Agent, or Firm* — DLA Piper LLP US (57) ABSTRACT

A system and method for controlling a non-tactile device including a receiving device configured to receive signals corresponding to a user's EEG or movements, translate the EEG or movements into directional intentions, transmit the directional intentions to a secondary device, receive a command for one or more actions from the secondary device based on the transmitted directional intentions and output at least one control signal to the non-tactile device based on the received command for one or more actions. The non-tactile device may receive signals corresponding to a user's EEG or movements using a gestural sensor and/or an EEG sensor.

18 Claims, 5 Drawing Sheets

(56) References Cited

U.S. PATENT DOCUMENTS

| | | | |
|---|---|---|---|
| 6,024,700 | A | 12/2000 | Nemirovski et al. |
| 6,353,754 | B1 | 3/2002 | Fischell et al. |
| 6,377,833 | B1 | 4/2002 | Albert |
| 6,402,520 | B1 | 6/2002 | Freer |
| 6,503,197 | B1 | 1/2003 | Nemirovski |
| 6,529,773 | B1 | 3/2003 | Dewan |
| 6,636,763 | B1 | 10/2003 | Junker et al. |
| 6,829,502 | B2 | 12/2004 | Hong et al. |
| 6,952,809 | B2 | 10/2005 | Beranek et al. |
| 6,983,184 | B2 | 1/2006 | Price |
| 7,120,486 | B2 | 10/2006 | Leuthradt et al. |
| 7,260,430 | B2 | 8/2007 | Wu et al. |
| 7,580,742 | B2 | 8/2009 | Tan et al. |
| 7,706,871 | B2 | 4/2010 | Devlin et al. |
| 8,350,804 | B1 | 1/2013 | Moll |
| 8,786,546 | B1 * | 7/2014 | Bendickson ............ G06F 3/015 345/157 |
| 8,822,674 | B2 | 9/2014 | Birnbaum et al. |
| 9,042,201 | B2 | 5/2015 | Tyler et al. |
| 9,405,366 | B2 | 8/2016 | Segal |
| 9,740,285 | B2 | 8/2017 | Beaty |
| 10,275,027 | B2 * | 4/2019 | Segal ..................... G06F 3/012 |
| 2002/0103429 | A1 | 8/2002 | DeCharms |
| 2004/0117098 | A1 | 6/2004 | Ryu et al. |
| 2005/0131311 | A1 | 6/2005 | Leuthardt et al. |
| 2005/0153268 | A1 | 7/2005 | Junkin et al. |
| 2005/0177058 | A1 | 8/2005 | Sobell |
| 2007/0123350 | A1 | 5/2007 | Soderlund |
| 2008/0208008 | A1 | 8/2008 | Turner |
| 2008/0208072 | A1 | 8/2008 | Fadem et al. |
| 2008/0211768 | A1 | 9/2008 | Breen et al. |
| 2009/0221928 | A1 | 9/2009 | Einav et al. |
| 2009/0306531 | A1 | 12/2009 | Leuthardt et al. |
| 2009/0318826 | A1 | 12/2009 | Green et al. |
| 2010/0040292 | A1 | 2/2010 | Clarkson |
| 2010/0100001 | A1 | 4/2010 | Aguilar et al. |
| 2011/0074668 | A1 * | 3/2011 | Mandanapu ............ G06F 3/015 345/156 |
| 2011/0234384 | A1 * | 9/2011 | Agrawal ............... G09B 21/009 340/10.5 |
| 2012/0049998 | A1 | 3/2012 | Lim et al. |
| 2012/0220889 | A1 | 8/2012 | Sullivan et al. |
| 2013/0096453 | A1 | 4/2013 | Chung et al. |
| 2013/0106707 | A1 | 5/2013 | Chen |
| 2013/0106742 | A1 | 5/2013 | Lee et al. |
| 2013/0179088 | A1 | 7/2013 | Garripoll |
| 2013/0211238 | A1 | 8/2013 | DeCharms |
| 2013/0289654 | A1 * | 10/2013 | Zhang ................. A61N 1/36036 607/57 |
| 2013/0315425 | A1 | 11/2013 | Lunner |
| 2013/0346168 | A1 | 12/2013 | Zhou et al. |
| 2015/0313496 | A1 | 11/2015 | Connor |
| 2015/0324181 | A1 * | 11/2015 | Segal ..................... G06F 9/5088 717/178 |
| 2016/0299568 | A1 * | 10/2016 | Segal ..................... G06F 16/436 |

OTHER PUBLICATIONS

Wolpaw, et al., "Control of a two-dimensional movement signal by a noninvasive brain-computer in humans", PNAS, Dec. 21, 2004, pp. 17849-17854, vol. 101, No. 51.

Zyga, "Machine Translates Thoughts into Speech in Real Time", https://medicalxpress.com/news/2009-12-machine-thoughts-speech-real.html, Dec. 21, 2009.

Wolpaw, et al., "Brain-computer Interfaces for Communication and Control", Clin Neurophysiol, Jun. 2002, pp. 767-761, vol. 113, No. 6.

Doherty, et al., "Improving the Performance of the Cyberlink Mental Interface with the Yes/No Program", Proceedings of CHI 2001, Dated Mar. 31, 2001, pp. 69-76, vol. 3, No. 1.

\* cited by examiner

APPARATUS, METHODS, AND SYSTEMS FOR USING IMAGINED DIRECTION TO DEFINE ACTIONS, FUNCTIONS, OR EXECUTION

CROSS-REFERENCE TO RELATED APPLICATIONS

This is a continuation of U.S. Non-Provisional application Ser. No. 15/877,206, filed Jan. 22, 2018, which claims the benefit of U.S. Provisional Application No. 62/449,158, filed Jan. 23, 2017. These applications are hereby incorporated by reference in their entirety.

TECHNICAL FIELD

The present disclosure relates to the control and operation of non-tactile devices, and more particularly, to a system and method for using data related to thought (i.e., imagined directions) and motion to control the operation of a non-tactile device and/or communicate.

BACKGROUND

Electroencephalograms (EEGs), magnetic electroencephalograms (MEGs) and the like are often used to detect, receive, process, convert, and record brain waves. The brain waves detected, received, processed, converted and recorded by these devices are often converted into signals that may be utilized to control other objects/devices, communicate with other objects/devices and/or other humans and the like.

U.S. Pat. No. 9,405,366, which is hereby incorporated by reference in its entirety to the extent not inconsistent with the present application, describes a device configured to detect, receive, process convert and record brain waves into signals that may be used to control other objects/devices and communicate with other objects/devices and/or other humans and the like.

Conventional devices that detect, receive process, convert and record brain waves into signals that may be utilized to control other objects/devices and communicate with other objects/devices, and/or other humans are presently often inaccurate and slow. For example, non-invasive devices that detect, receive, process, convert and record brain waves are often unable to accurately detect, receive, process, and record such brain waves due to shielding from the skull, the presence of other electrical signals around the patient (such as, for example as, cell phones and other electronic devices), noisy signal acquisition, low signal resolution, and the like. Furthermore, the ability to accurately detect, receive, process, convert and record brain waves may be impacted by the devices user's emotions, levels of concentration and the device's sensitivity. It is also difficult to identify the specific brain-signal of interest amongst all the different brain waves simultaneously detected by the device at any one time.

Additionally, the brain waves acquired by EEG and MEG-like devices may be difficult to detect, receive, process, record, and convert into signals used to control other objects/devices and communicate with other objects/devices and/or other humans. Often times, it is difficult to identify patterns within the brain waves that may be used to convert the brain waves (i.e., EEG data) into other signals used to control other objects and devices and/or communicate with other objects/devices and/or other humans due to the dynamic nature and high variability of detectable brain waves. To address this issue, many current devices require a training period (also referred to as "bio training"). During the training period, device users may train the device to identify brain wave patterns and associate them to specific executions or functions. However, the training period may require a user to undergo multiple training sessions and utilize specialized personnel to effectively and accurately train the device to detect the user's brain waves. Moreover, a user may be able to imagine certain thoughts more easily than other thoughts. For example, a user may have a preferred imagined direction that is easier to think about than others are. For this reason, it may be easier to train the device to detect the user's brain waves for some directions more easily than for others. These issues may prevent a device from being universally usable.

Additionally, because a large amount of individual EEG data must be processed in order to effectively and accurately isolate a specific pattern or signal of interest, currently there can be a long latency between when the user acquires the EEG data and when the brain wave signal is transmitted to control other devices. In other words, there is a long delay between when the user acquires the EEG data and when the signal is transmitted to control other objects/devices and or with other objects/devices and/or other humans that receive the transmitted signal is produced and/or implemented. For example, a state-of-the art brain wave to communication device in September 2016 allowed a monkey to type 12 words per minute (http://spectrum.ieee.org/the-human-os/biomedical/bionics/monkeys-type-12-words-per-minute-with-braintokeyboard-communication).

To obtain a higher signal resolution many devices that acquire brain waves include components that are implanted within the user's skull. Such devices are extremely invasive and required skilled personnel to implant, monitor, and use the device.

In an effort to address some of the issues discussed above, some current devices aim to link brain waves acquired by the device with easily identifiable behaviors such as eye-blinks, smiles, jaw clenches, and brow raises. These easily identifiable behaviors are often used to indicate the onset of a pattern or brain-signal of interest that should be converted into a signal to control other objects/devices, communicate with other objects/devices and/or other humans and the like. However, there remains a limited group of easily identifiable behaviors that may be linked to brain waves. Furthermore, many of the easily identifiable behaviors are overt and easily visible.

SUMMARY

Accordingly, there is a need for a device that detects, receives, processes, converts, and records brain waves (i.e., EEG data) to signals used for control of other objects/devices and communication with other objects/devices and/or other humans that is covert, accurate, fast and may be easily used by a wide range of users without substantial bio training.

In an exemplary embodiment, a device detects, receives, processes, converts, and records EEG data and microgestural data to signals that are transmitted in order to control other objects/devices, communicate with other objects/devices and/or transmits to and receives EEG data and micro-gestural data from other humans. The device is covert, accurate, fast and may be easily used by a wide range of users without substantial bio training.

In an exemplary embodiment, the device may include a gestural sensor and/or an EEG sensor configured to receive one or more bio-signals from a user. As used herein, bio-signals may be defined as gestural data and EEG data. In some embodiments, the device may include a non-transitory memory component configured to store software that causes a process component, coupled to the gestural and/or EEG sensor, to aggregate and transmit via a communications component the one or more bio-signals to a separate, secondary device, such as, for example, a mobile device or a computer etc. A power source component of the device may be configured to power at least one of the gestural sensor and/or the EEG sensor, the non-transitory memory, power components, and communications component. In some embodiments, the device may be configured to fit substantially within an ear canal, or other operable location within the near operative vicinity of the user.

DETAILED DESCRIPTION

In an exemplary embodiment, a device detects, receives, processes and records EEG data to signals used for control of other objects/devices and communication with other objects/devices and/or other humans. The device may be covert, accurate, and fast and may be easily used by a wide range of users without substantial user bio training.

Figure 1A:
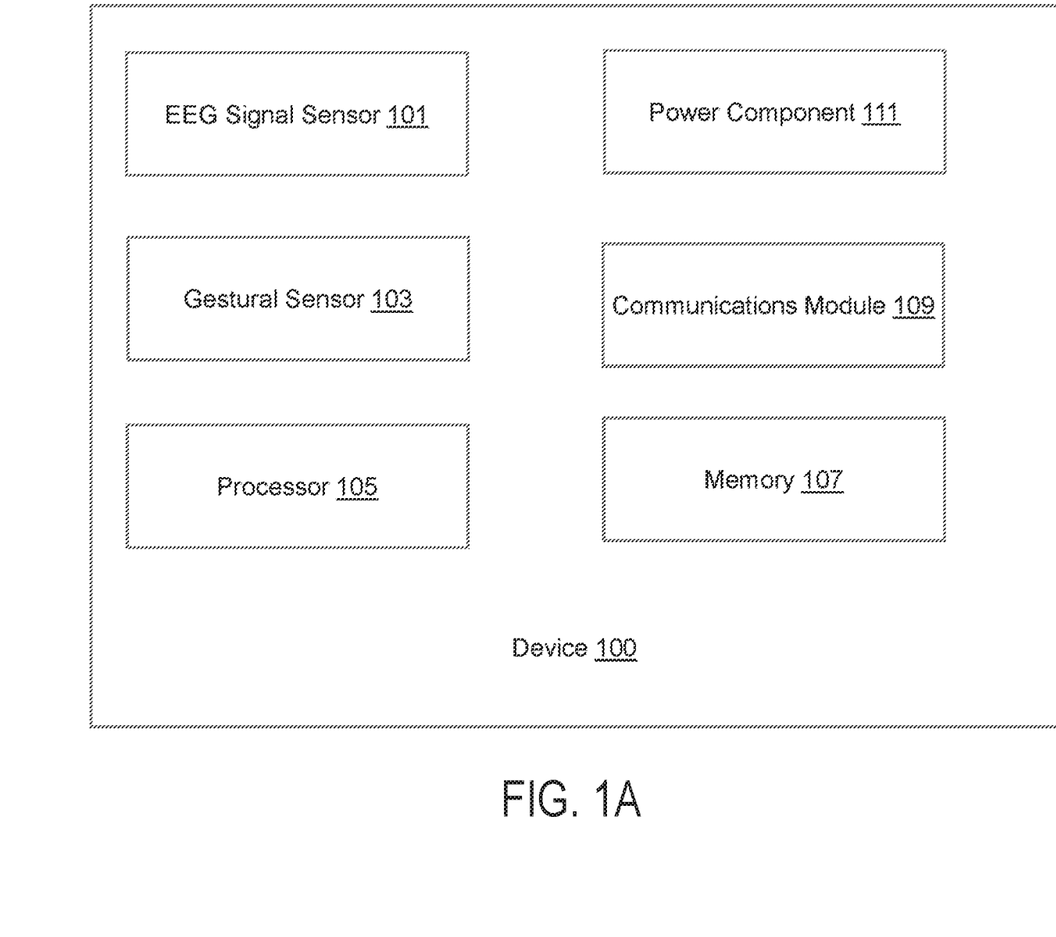
FIG. 1A illustrates the components of an exemplary embodiment of the device.

FIG. 1A illustrates the components of an exemplary device 100. The device 100 may include a brain signal sensor such as EEG signal sensor 101 configured to detect, receive, process, convert, record and transmit EEG data. The device 100 may also include a gestural sensor 103 configured to detect, receive, process, convert, record and transmit gestural signal data. The device 100 may also include a processor component 105 configured to detect, receive, process, convert, record and transmit EEG data from the EEG signal sensor 101 and the gestural signal sensor data obtained and processed from the gestural sensor 103. The processor component 105 may be controlled by software located on non-transitory memory 107 stored on the device 100. The device 100 may also include a communications module 109 configured to detect, receive, process, convert record and transmit data and/or information from the device 100 to anyone of a plurality of separate devices and/or humans. The components of the device 100 may be powered by one or more power components 111.

In one exemplary embodiment, the EEG signal sensor 101, the gestural sensor 103, the processor component 105, non-transitory memory 107, and communications module 109 may be contained within the device 100. In one illustrative embodiment, the device 100 may take the shape of an ear-bud or similar device. In such an embodiment, at least a portion of the device 100 may be configured to fit within the ear canal of a user. In another illustrative embodiment, the device 100 may be worn covertly. For example, the device 100 may preferably not be visible to someone interacting with the user (i.e., covert).

In some embodiments, brain signal sensor may include one or more of an electroencephalogram (EEG), magnetic electroencephalograms (MEGs), and the like. The EEG signal sensor 101 may be configured to obtain EEG data from a user. The EEG signal sensor 101 may include one or more electrodes configured to project into the ear canal and in the operative vicinity of the user to record EEG data from the user's head. In some embodiments, the device 100 is configured to detect, receive process, convert, record, and transmit gestural data into signals to control other objects, devices and/or with other objects/devices and/or other humans. In one embodiment, the EEG signal sensor 101 may record electrical activity such as mu rhythms, EMG signals and the like from the temple, behind the user's ear, and/or the mastoid region.

In one embodiment, the EEG signal sensor 101 may include at least one active dry EEG electrode. For example, a single sensor EEG may be configured to record from on the temple or behind the ear on the mastoid. The placement of the single sensor EEG may be optimized to detect, for example, but not limited to, a jaw clench or the like.

The gestural sensor 103 may include one or more of an accelerometer, gyroscope, and the like. The gestural sensor 103 may provide head tracking by recording rotational, altitude, acceleration vectors, movements and the like. The gestural sensor 103 may record movements from a location, such as, for example, but not limited to, the operative vicinity of a user. In one embodiment, each of the accelerometer and gyroscope may record movements along three axes. In an embodiment where the gestural sensor 103 includes both an accelerometer and a gyroscope, the gestural sensor 103 may record movement along six axes (three from each of the gyroscope and accelerometer). In one illustrative embodiment, the gyroscope is a micro-gyroscope. In another embodiment, movements recorded by the micro-gyroscope may include head turns, head tilts, head nods and the like.

In another illustrative embodiment, the gestural sensor 103 may include an inner ear pressure sensor (not shown) that is configured to detect changes in the inner ear pressure of a user. The inner ear pressure of a user may change in accordance with the balance and movement of the user. Accordingly, the inner ear pressure sensor may provide additional information regarding gestural behavior. The gestural sensor 103 may also detect the head turns, head tilts, head nods, jaw clenches and other covert behaviors, detected by the micro-gyroscope. It is envisioned that the gestural motions such as jaw clenches may cause changes in inner ear pressure that are detectable by the inner ear pressure sensor.

By using gestural data obtained by the gestural sensor 103, the device 100 is able to address the challenges presented by conventional devices that aim to detect, receive, process, convert, record and transmit EEG data and microgestural to signals used for control of other objects/ devices and communication with other objects/devices and/ or other humans. Information from gestural sensors 103 (and more specifically accelerometers and micro-gyroscopes) may include recorded movement. Recorded movement allows for a more accurate and faster input and is universal between users, unlike thoughts of imagined directions. The recorded movement from gestural sensors 103 is universal and reproducible.

Additionally, while the speed in detecting and interpreting EEG data may sometimes be slow, gestural data such as those obtained from gestural sensors, such as accelerometers, micro-gyroscopes and/or inner ear pressure monitors, is available almost immediately and is often easier to interpret accurately than EEG data. Furthermore, while conventional systems that convert brain waves such as imagined directions into signals used for control of other objects/devices and communication with other objects/devices and/or other humans are often dependent on a user's ability to imagine directions, and often brain waves associated with one direction are often more pronounced and strongly differentiable than brain waves associated with a different direction.

By contrast, gestural signals such as those acquired by gestural sensors such as micro-gyroscopes accelerometers, and/or inner ear pressure monitors are able to detect signals associated with all directions equally. Accordingly, the device 100 has many benefits over current conventional systems by using both gestural data and EEG data to detect, receive, process, convert, record and transmit EEG data and microgestures into signals to control other objects/devices and with other objects/devices and/or other humans.

The processor 105 may control the operation of the EEG signal sensor 101, gestural sensor 103, communications module 109, and any other additional components of the device 100. The processor 105 may be controlled by software instructions (and the like) stored on non-transitory memory component 107 of the device.

The components of the device 100 including the EEG signal sensor 101, gestural sensor 103, processor 105, communication module 109, non-transitory memory 107, and the like may be powered by way of the power component 111. In one embodiment, the power component 111 may include batteries and/or rechargeable batteries and the like.

In some embodiments, the communication module 109 may include components to transmit data and information from the device 100 to a separate device. Data and information may be transmitted in any suitable format including wireless and wired communication. The data and information may be transmitted in accordance with any suitable security protocol and the like. The communication module 109 may also receive data and information from separate devices that include signals to control the operation of the device 100. In one embodiment, the communication module 109 may first receive software updates that are later used to update software code stored on the non-transitory memory component 107 of the device. In one embodiment, the communication module 109 may receive signals from a separate device that control the operation of the device 100, including signals that cause one or more components of the device 100 to vibrate, illuminate, emit sound, or the like. The vibrations, illuminations, sounds, may be used by the separate device to communicate with other objects/devices and/or other humans with a user of the device 100.

EEG data recorded by the EEG signal sensor 101 may be processed at the EEG signal sensor 101 and/or at the processor 105 prior to being transmitted by the communication module 109 from device 100 to a separate device. Gestural data recorded by the gestural sensor 103 may be processed at the EEG signal sensor 101 and/or at the processor 105 prior to being transmitted by the communication module 109 from device 100 to a separate device. Processing may include isolating one or more signals or waveform of interest by applying filters, algorithms, signal processing techniques, and the like. Alternatively, the raw data recorded by each of the gestural sensor 103 and EEG signal sensor 101 may be transmitted without any processing to the separate device, such as, for example, micro device, mobile device or computer by way of the communication module 109. In this manner, the latencies associated with processing the raw data may be avoided.

The gestural data recorded by the gestural sensor 103 may be indicative of the onset of a directional thought or motion. EEG and gestural signals corresponding to a directional thought or motion may be obtained by the EEG signal sensor 101 and gestural sensor 103 of the device 100 processed by the processor 105, which routes the directional thought or motion information obtained by one or both of the gestural sensor 103 and EEG signal sensor 101 to the communication module 109 for transmission from the device 100 to a separate device.

EEG signals and gestural signals corresponding to a directional thought or motion may be received by a separate device. In one embodiment, the separate device may include one or more computers with one or more processors and non-transitory memory. The separate device may be a laptop, desktop, tablet, cell phone, or the like. The separate device may receive the EEG signals and/or gestural signals corresponding to a directional thought. The directional thought may be converted into a rune and/or line movements in accordance with the techniques discussed in U.S. Pat. No. 9,405,366. The rune and/or line movements may be used to control the operation of a software application for communication located at the separate device. In one embodiment, the separate device either automatically or by way of user input, may transmit a signal to the device 100 responsive to translating the rune and/or line movements.

The device 100 may include additional components as needed for operation in accordance with the description herein.

Figure 1B:
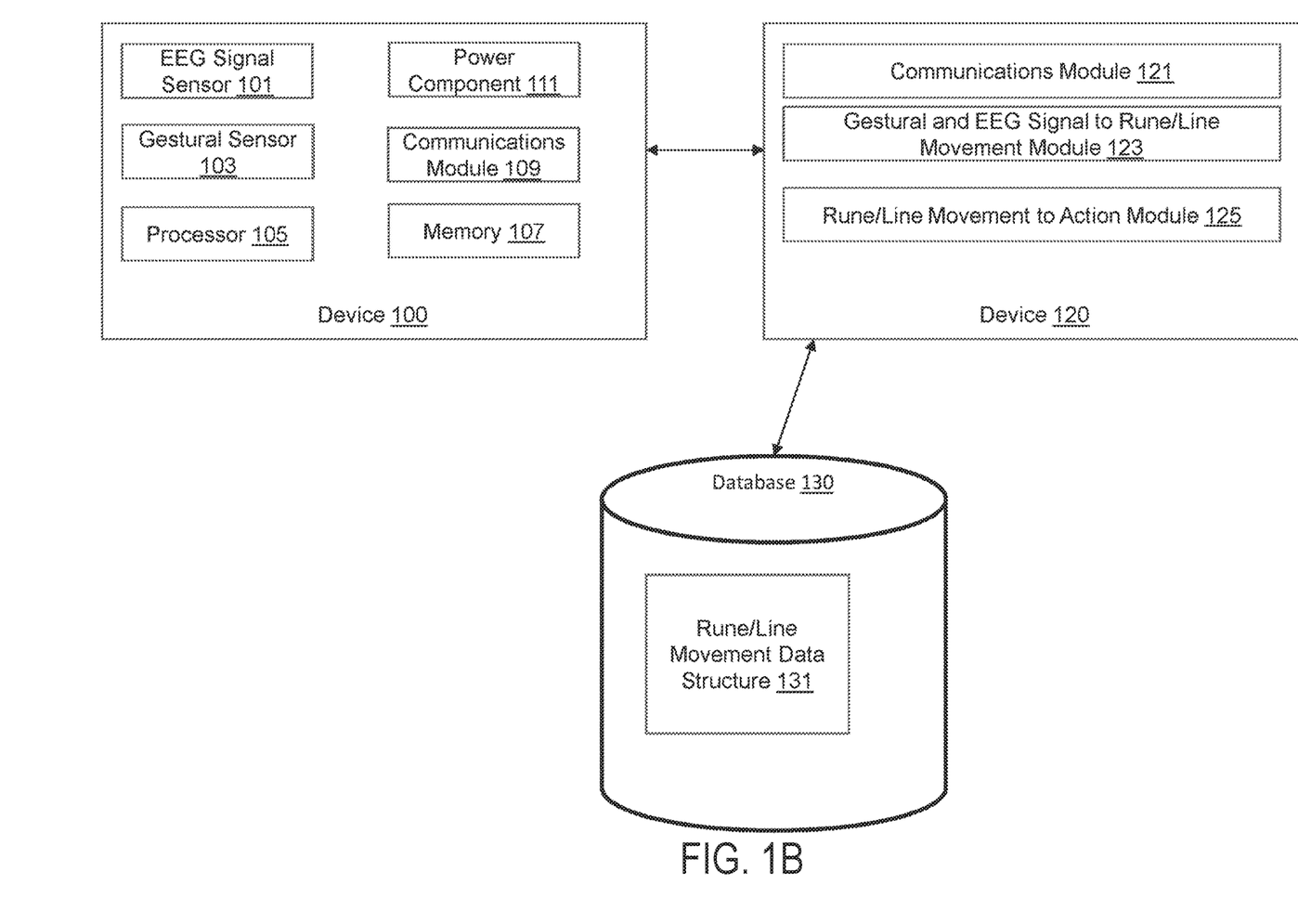
FIG. 1B illustrates the components of an exemplary embodiment of a system using the device of FIG. 1A.

FIG. 1B illustrates an exemplary embodiment of a system using the device of FIG. 1A. As illustrated, the device 100 may be communicatively coupled via communications module 109 to a second device 120. The second device 120 may include a communication module 121, a gestural and EEG signal to rune/line movement module 123 and a rune/line movement to action module 125. The second device 120 may be coupled to a database 130. The database 130 may include a rune/line movement data structure 131. The gestural and EEG signal to rune/line movement module 123 may be configured to aggregate and process gestural and EEG signals in order to determine a rune and/or line movement. The process for aggregating and processing gestural and EEG signals may be in accordance with what is described by U.S. Pat. No. 9,405,366, the disclosure of which is hereby incorporated by reference to the extent not inconsistent with the present application. Once the gestural and EEG signals are transformed and converted into rune and/or line movements, the rune/line movement to action module 125 may access database 130 to retrieve information regarding the actions corresponding to the rune and/or line movement from rune/line movement data structure 131. In one embodiment, responsive to retrieving an action by the rune/line movement to action module 125, the device 120 may perform one or more actions. Example actions may include transmitting a signal to the first device 100 to cause the first device 100 to vibrate, illuminate, emit sound, or the like. In some embodiments, the rune/line movement to action module 125 may use the communications module 121 to transmit a signal to the first device 100. In one embodiment, the device 120 may include a user interface that is configured to display a message or emit a sound corresponding to the rune/line movement based on the information retrieved from the rune/line movement data structure 131 from the rune/line movement to action module 125. In one embodiment, the action may correspond to sending a signal to control the operation of one or more devices distinct from device 120 and/or device 100.

Figure 2:
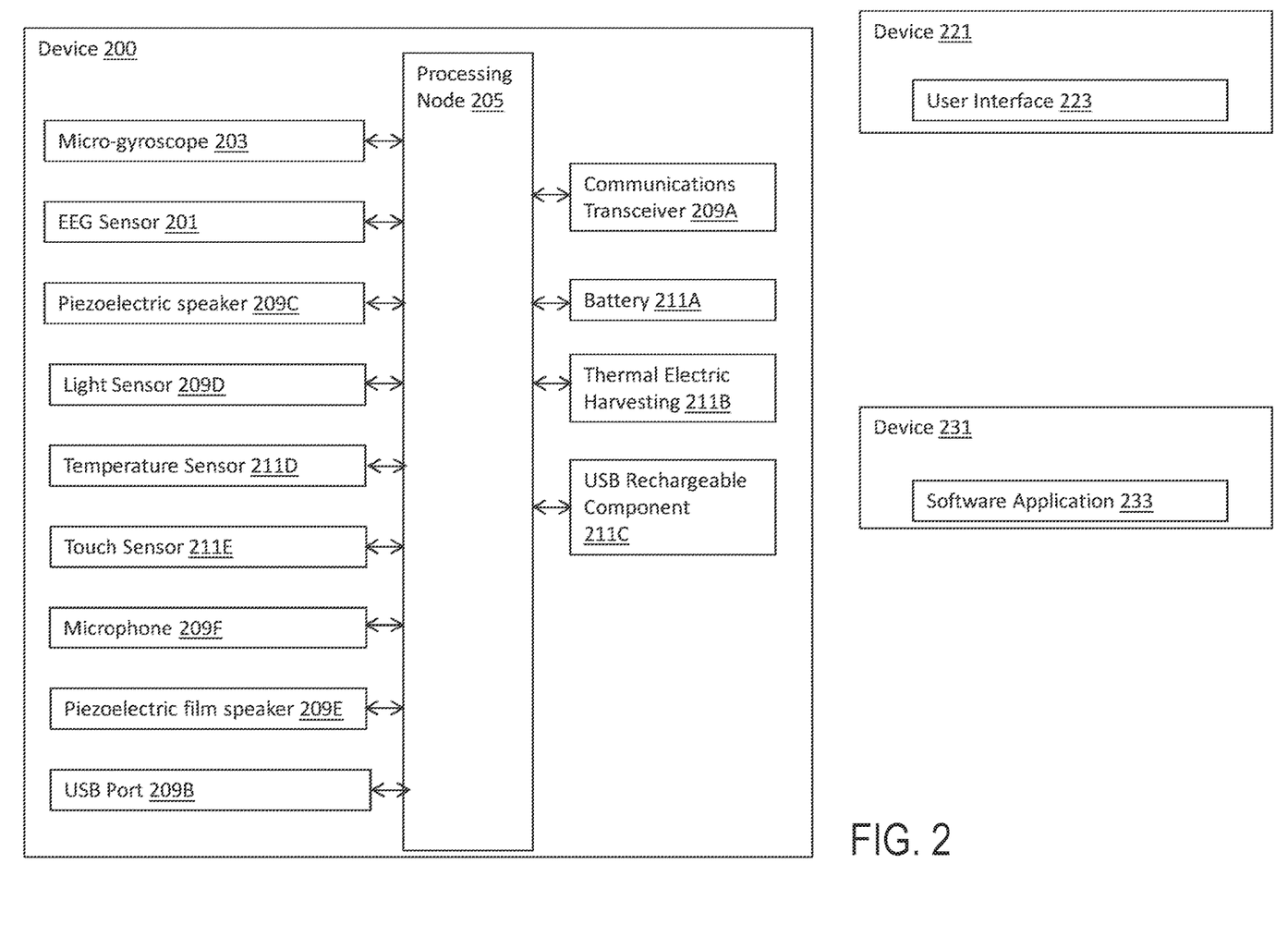
FIG. 2 illustrates the components of an exemplary embodiment of the device.

FIG. 2 illustrates another exemplary embodiment of the device 200 which may include one or more of the following elements (without limitation): gestural sensor such as a micro-gyroscope 203, a brain-wave sensor such as EEG sensor 201, a piezoelectric speaker 209C, a light sensor 209D, a temperature sensor 211E, a microphone 209F, a piezoelectric film speaker 209E, a USB port 209B, a communications transceiver U209A, a battery 211A, a thermal electric harvesting component 211B, and a USB rechargeable charger 211C. As illustrated, the components of device 200 may be communicatively coupled by way of a processing node 205. The components of the device 200 may be coupled to a printed circuit board.

In one embodiment, the EEG sensor 201 may be a 100 mV signal sensor with an operational amplifier. In one embodiment, the temperature sensor 211D may be a negative temperature coefficient (NTC) temperature sensor. In one embodiment, the piezoelectric speaker 209C may receive audio signals from a separate device 221, 231 by way of a communications transceiver 209A. In one embodiment the communications transceiver 209A may be a Bluetooth® transceiver. Upon receiving such a signal, the piezoelectric speaker 209C may emit an audio signal to the user of the device 200.

A communications module may include the communications transceiver 209A (e.g., Bluetooth® transceiver) which is configured to stream data and information from the micro-gyroscope 203, and/or the EEG sensor 201, and/or digital audio between the user of the device 200 and a separate device 221, 231. The communication module of device 200 may also include a USB port 209B that is configured to link to a separate device via a wireless or wired connection. The USB port 209B may be configured to receive software updates for the components of the device 200.

In one embodiment, the battery 211A may be an alkaline battery that is configured to generate all the voltages required by the sensors 203, 201, components of the communication module including speakers 209C, communications transceiver 209A, USB port 209B, and the like. Optionally, the power component, battery 211A may be rechargeable by way of a near-field charger and/or USB rechargeable component 211C. Alternatively, the battery 211A may also be rechargeable by way of a thermal electric harvesting component 211B. Power to the components of the device 200 from the battery 211A may managed by a button or the like.

The exemplary embodiment of the device 200 depicted in FIG. 2 may wirelessly transmit gestural signals and EEG signals to separate devices such as a computer system 221 operating in a software environment specially configured with an application interface to control operation of the device 200. The computer system 221 may also include a user interface 223, debugging software, testing software, other health monitoring applications, and the like.

The exemplary embodiment of the device 200 depicted in FIG. 2 may also wirelessly (by way of Bluetooth® or other means) transmit gestural signals and EEG signals to a separate portable device 231 such as a cell phone, tablet, or the like. The separate portable device 231 may be operating an application 233 specially configured to control the operation of the device 200.

Figure 3:
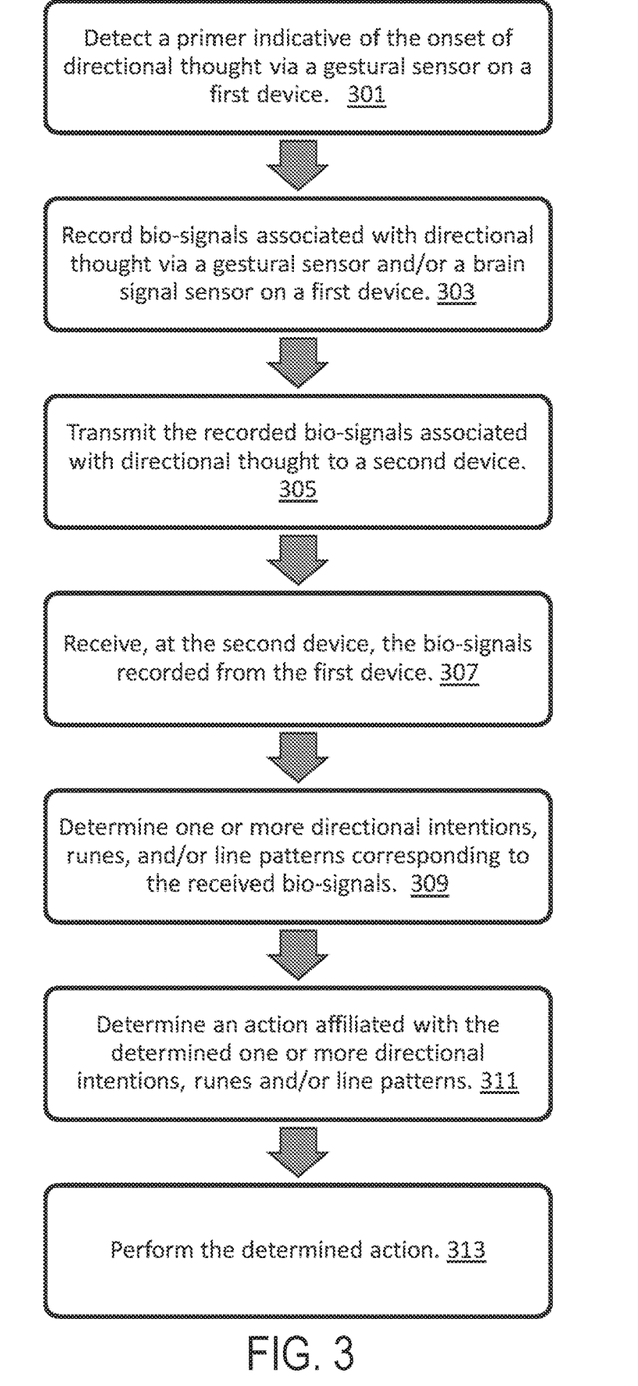
FIG. 3 illustrates a block diagram of a method for use in accordance with an exemplary embodiment of the device.

FIG. 3 illustrates a block diagram of a method for use in accordance with an exemplary embodiment of the device. At a first step 301, a first device detects a primer indicative of the onset of directional thought via a gestural sensor on the first device. At a second step 303, the device records bio-signals associated with directional thought via a gestural sensor and/or an EEG sensor on the first device. A bio-signal may include an EEG signal and/or a gestural signal such as a gyroscope signal, accelerometer signal and the like. The first device may then transmit the recorded bio-signals associated with directional thought to a second device at step 305. The second device may receive the bio-signals recorded from the first device at step 307. The second device may then process the received bio-signals into a series of directional intentions, runes, and/or line patterns at step 309. The second device may also search in a database for a corresponding action affiliated with the determined directional intention, rune and/or line pattern at step 311. The second device may also match the obtained directional intention, rune and/or line pattern with the corresponding element stored in the database in step 311. At step 313, the second device may then perform the operation or action indicated by the directional intention, rune and/or line pattern matched in step 311. The processes performed by the second device to convert the received bio-signals into an operation are described in U.S. Pat. No. 9,405,366. The operation may include transmitting a signal to the first device to vibrate, illuminate, emit sound, or the like.

Figure 4A:
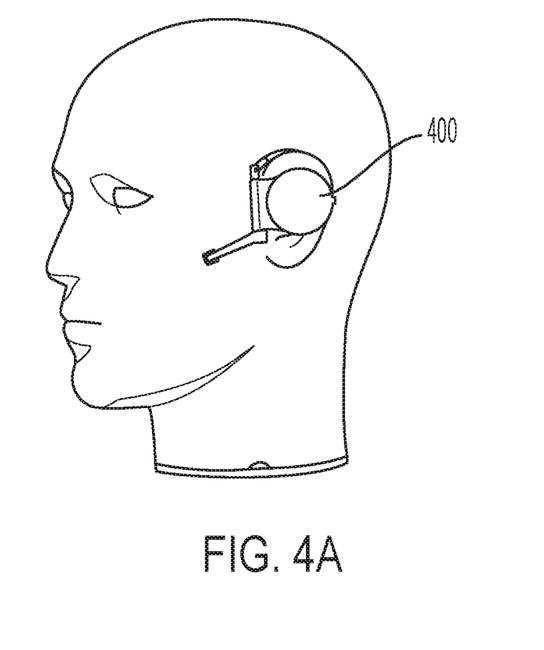
FIG. 4A illustrates an exemplary embodiment of the device at least partially located within the ear canal.
Figure 4B:
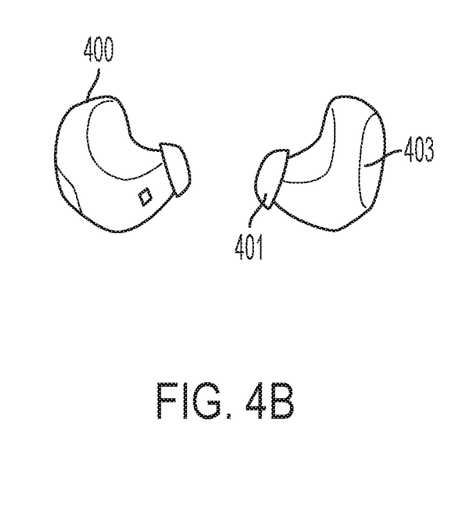
FIG. 4B illustrates an exemplary embodiment of the device that comprises an earbud.

FIG. 4A illustrates an exemplary embodiment of the device at least partially located within the ear canal. The device 400 may include one or more of the components discussed above with respect to the FIGS. 1 and 2. FIG. 4B illustrates an exemplary embodiment of the device that comprises an earbud. The device 400 includes an outer housing 403 visible to a user, and a cushion area 401 configured to fit at least substantially within a user's ear canal. The outer housing 403 may be shaped to conform to the anatomy of a user's ear. The cushion area 401 may be made of soft and flexible material such as silicone. Alternative materials may be used. The cushion area 401 may form a seal with the user's ear canal to prevent audio leakage. The outer housing 403 may be constructed using 3D printer. In one embodiment, the device is operative within the vicinity of a user, within the vicinity of a user's ear, or within the vicinity of a user's ear canal or other operative locations.

Systems and methods of the present disclosure may include and/or may be implemented by one or more specialized computers including specialized hardware and/or software components. For purposes of this disclosure, a specialized computer may be a programmable machine capable of performing arithmetic and/or logical operations and specially programmed to perform the particular functions described herein. In some embodiments, computers may include processors, memories, data storage devices, and/or other specially programmed components. These components may be connected physically or through network or wireless links. Computers may also include software, which may direct the operations of the aforementioned components. Computers may be referred to with terms such as servers, personal computers (PCs), mobile devices, and other terms that may be interchangeable therewith, and any special purpose computer capable of performing the described functions may be used.

As used herein, the word "Module" or "modules" may include specially configured hardware and/or software components. In general, the word module, as used herein, may refer to logic embodied in hardware or firmware or to a collection of software instructions. Generally, the modules described herein refer to logical modules that may be combined with other modules or divided into sub-modules despite their physical organization or storage.

Computers may be linked to one another via one or more networks. A network may be any plurality of completely or partially interconnected computers, wherein some or all of the computers are able to communicate with one another. Connections between computers may be wired in some cases (e.g., via wired TCP connection or other wired connection) or may be wireless (e.g., via a Wi-Fi network connection). Any connection through which at least two computers may exchange data may be the basis of a network. Furthermore, separate networks may be able to be interconnected such that one or more computers within one network may communicate with one or more computers in another network. In such a case, the plurality of separate networks may optionally be considered a single network.

The non-transitory memory component described above may include, for example, without being limited to, at least one of a read-only memory (ROM), a random access memory (RAM), a flash memory, a dynamic RAM (DRAM) and a static RAM (SRAM), storing computer-readable instructions executable by processing components. Memory components may include any suitable non-transitory computer readable storage medium storing computer-readable instructions executable by processing components for performing the operations described herein. Although only one memory component is illustrated in each of FIGS. 1 and 2, in some examples, the one or more computer systems may include two or more memory devices (e.g., dynamic memory and static memory).

In some examples, the one or more computer systems may include data storage devices storing instructions (e.g., software) for performing any one or more of the functions described herein. Data storage devices may include any suitable non-transitory computer-readable storage medium, including, without being limited to, solid-state memories, optical media, and magnetic media.

The term "computer" shall refer to an electronic device or devices, including those specifically configured with capabilities to be utilized in connection with a data conversion and distribution system, such as a device capable of receiving, transmitting, processing and/or using data and information in the particular manner and with the particular characteristics described herein. The computer may include a server, a processor, a microprocessor, a personal computer, such as a laptop, palm PC, desktop or workstation, a network server, a mainframe, an electronic wired or wireless device, such as for example, a telephone, a cellular telephone, a personal digital assistant, a smartphone, an interactive television, such as for example, a television adapted to be connected to the Internet or an electronic device adapted for use with a television, an electronic pager or any other computing and/or communication device specifically configured to perform one or more functions described herein.

The term "network" shall refer to any type of network or networks, including those capable of being utilized in connection with a data conversion and distribution system described herein, such as, for example, any public and/or private networks, including, for instance, the Internet, an intranet, or an extranet, any wired or wireless networks or combinations thereof.

The term "user interface" shall refer to any suitable type of device, connection, display and/or system through which information may be conveyed to and received from a user, such as, without limitation, a monitor, a computer, a graphical user interface, a terminal, a screen, a keyboard, a touchscreen, a biometric input device that may include a microphone and/or camera, a telephone, a personal digital assistant, a smartphone, or an interactive television.

The term "computer-readable storage medium" should be taken to include a single medium or multiple media that store one or more sets of instructions. The term "computer-readable storage medium" shall also be taken to include any medium that is capable of storing or encoding a set of instructions for execution by the machine and that causes the machine to perform any one or more of the methodologies of the present disclosure.

The term "or" may be construed in an inclusive or exclusive sense. Similarly, the term "for example" may be construed merely to mean an example of something or an exemplar and not necessarily a preferred means of accomplishing a goal.

While the present disclosure has been discussed in terms of certain embodiments, it should be appreciated that the present disclosure is not so limited. The embodiments are explained herein by way of example, and there are numerous modifications, variations and other embodiments that may be employed that would still be within the scope of the present invention.

I claim:

1. A device comprising:
    an electroencephalogram (EEG) signal sensor configured to record EEG signals indicative of a directional intention from a user of the device;
    a gestural sensor configured to record gestural signals from the user; and
    a communications module configured to:
        transmit the recorded EEG signals and the recorded gestural signals to a secondary device communicatively coupled to the device,
        receive one or more action signals from the secondary device, and
        perform at least one action based on the received one or more action signals from the secondary device.

2. The device of claim 1, wherein the one or more action signals correspond to one or more of a line pattern, a rune, and a directional intention determined based on the transmitted recorded EEG signals and gestural signals.

3. The device of claim 1, wherein the device further comprises a pressure sensor configured to record inner ear pressure from the user.

4. The device of claim 1, wherein the recorded EEG signals and gestural signals are indicative of at least one of a line pattern, a rune, and a directional intention.

5. The device of claim 1, further comprising at least one of a micro-gyroscope, an accelerometer a micro-piezoelectric speaker, a light sensor, a negative temperature coefficient (NTC) temperature sensor, a capacitive touch sensor, a microphone, and a piezoelectric film speaker.

6. The device of claim 1, wherein the secondary device is separate from the device and comprises at least one of a desktop, a cell phone, a tablet, or other remote computing device having at least one processor and at least one memory component.

7. The device of claim 1, wherein the EEG signals sensor is configured to begin recording EEG signals from the user and the gestural sensor is configured to begin recording gestural signals after detecting a movement in the EEG signal monitored by the EEG signal sensor.

8. The device of claim 1, wherein the device is configured to fit at least one of substantially within an ear canal of the user, and in the operative vicinity to an ear of the user.

9. A method comprising:
    recording, by an EEG signal sensor of a first device, a EEG signal indicative of a directional intention from a user;

recording, by a gestural sensor of the first device, a gestural signal from the user;

transmitting, by a communications component of the first device, the recorded EEG signal and the recorded gestural signal to a secondary device external to the first device;

receiving, by the communications component of the first device, one or more action signals from the secondary device; and performing, by the first device, at least one action based on the received one or more action signals from the secondary device.

10. The method of claim 9, wherein the first device further comprises a pressure sensor configured to record inner ear pressure from the user.

11. The method of claim 9, wherein the first device further comprises at least one of a micro-gyroscope, an accelerometer a micro-piezoelectric speaker, a light sensor, a negative temperature coefficient (NTC) temperature sensor, a capacitive touch sensor, a microphone, and a piezoelectric film speaker.

12. The method of claim 9, recording EEG signals and gestural signals from the user is responsive to detecting a movement in the EEG signal monitored by the EEG signal sensor.

13. The method of claim 9, wherein the first device is configured to fit at least one of substantially within an ear canal of the user, and in the operative vicinity of the user.

14. A method comprising:
receiving, by a second device communicatively coupled to a first device, an EEG signal indicative of at least one of a directional intention and a gestural signal from the first device;

determining, by the second device, at least one of a line pattern, a rune, and a directional intention based on the EEG signal and the gestural signal;

retrieving, by the second device, at least one action corresponding to the determined line pattern, rule and directional intention;

generating, by the second device, at least one action signal based on the retrieved action; and transmitting, by the second device, the at least one action signal to the first device.

15. The method of claim 14, wherein retrieving the at least one action further comprises: querying a database communicatively coupled to the second device.

16. The method of claim 14, wherein the second device is separate from the first device and comprises at least one of a desktop, a cell phone, a tablet, or other remote computing device having at least one processor and at least one memory component.

17. The method of claim 14, wherein the first device is configured to fit at least one of substantially within an ear canal of the user, and in the operative vicinity of the user.

18. The method of claim 9, wherein the one or more action signals correspond to one or more of a line pattern, a rune, and a directional intention determined based on the transmitted recorded EEG signal and the transmitted recorded gestural signal.

* * * * *

UNITED STATES PATENT AND TRADEMARK OFFICE
CERTIFICATE OF CORRECTION

| | |
|---|---|
| PATENT NO. | : 10,606,354 B2 |
| APPLICATION NO. | : 16/356701 |
| DATED | : March 31, 2020 |
| INVENTOR(S) | : David Lee Segal |

It is certified that error appears in the above-identified patent and that said Letters Patent is hereby corrected as shown below:

In the Claims

Column 12, Line 10, Claim 14, "rule" should be changed to --rune--

Signed and Sealed this
Eleventh Day of June, 2024

*Katherine Kelly Vidal*

Katherine Kelly Vidal
*Director of the United States Patent and Trademark Office*